Dec. 19, 1961  H. HILDRE  3,013,601
TIRE DEMOUNTING APPARATUS
Filed June 29, 1959  2 Sheets-Sheet 1
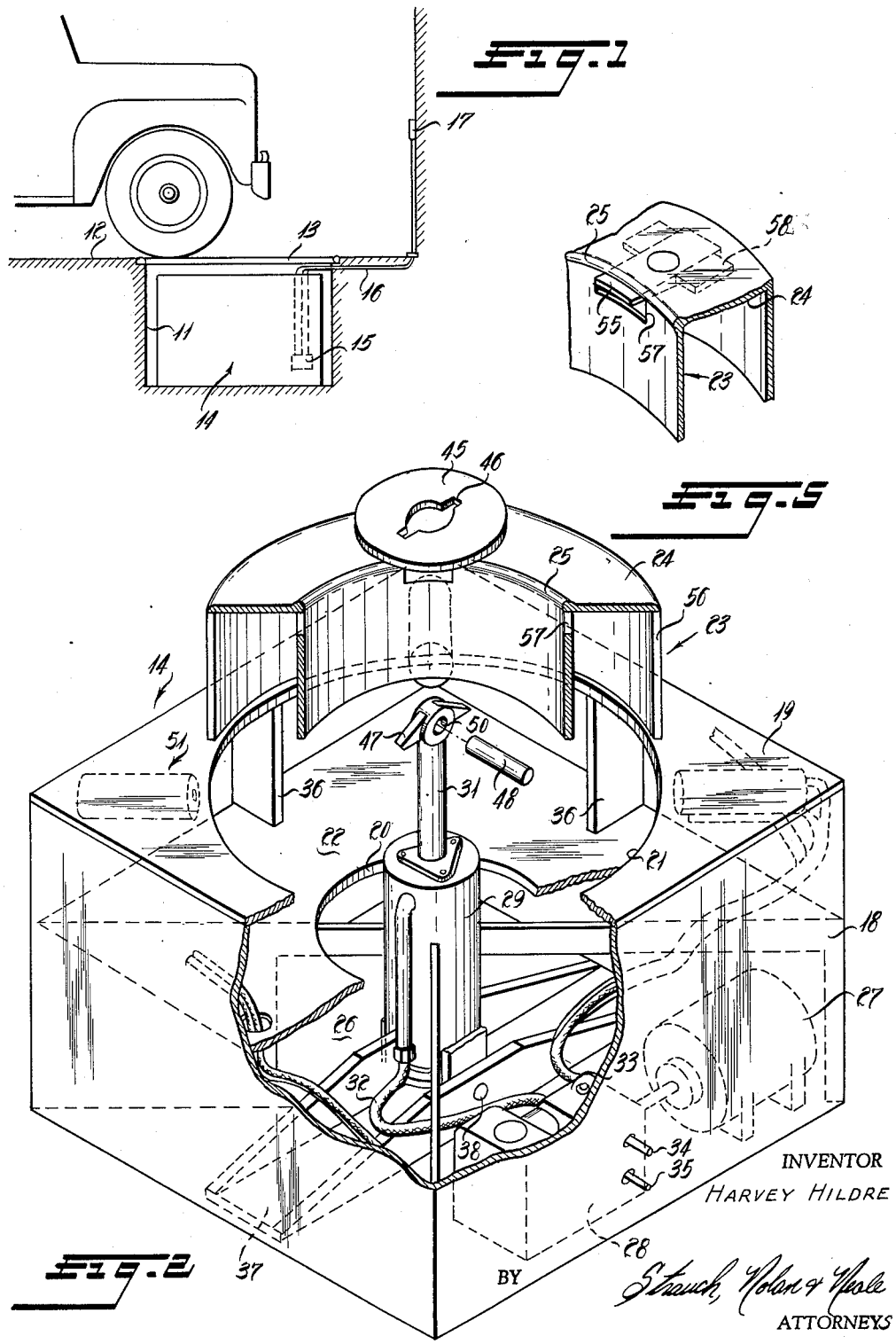
INVENTOR
HARVEY HILDRE
BY Strauch, Nolan & Neale
ATTORNEYS

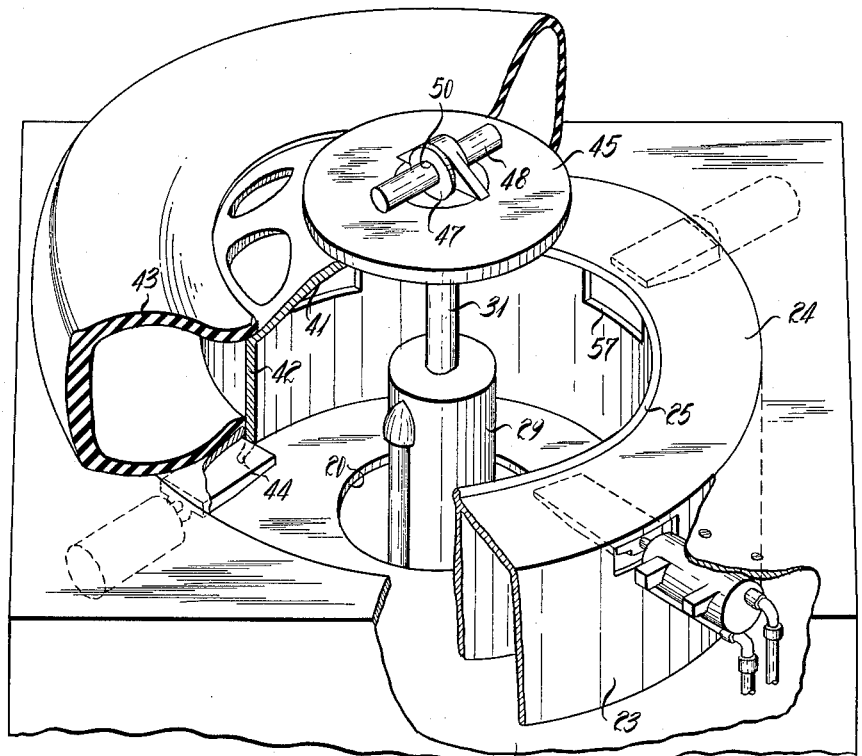
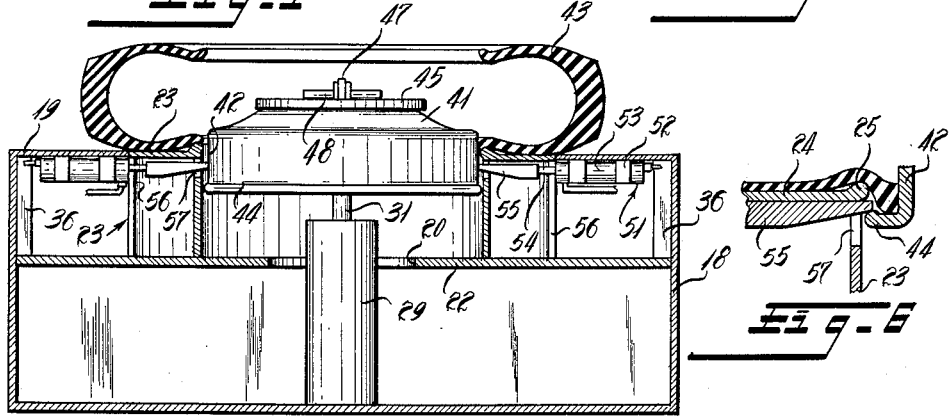
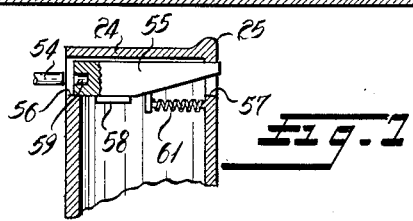
INVENTOR
HARVEY HILDRE

United States Patent Office 3,013,601
Patented Dec. 19, 1961

3,013,601
TIRE DEMOUNTING APPARATUS
Harvey Hildre, Fritz Cove, Alaska, assignor to The Cove Corporation, Juneau, Alaska, a corporation of Alaska
Filed June 29, 1959, Ser. No. 823,622
2 Claims. (Cl. 157—1.2)

This invention relates to apparatus for demounting pneumatic tires from wheels and particularly is concerned with a power-actuated arrangement that is especially effective for heavy duty truck and equipment tires, both tube and tubeless.

Power devices for separating tires and wheels or rims have been proposed before but most of these devices are rather complex and have not proved efficient in operation. According to this invention the wheel is pulled straight off the tire with uniformly distributed force, and special wedge means are provided for insuring uniform freeing action in event of abnormal adherence conditions.

It is therefore the major object of the invention to provide a novel power actuated apparatus for demounting a tire from a wheel rim.

A further object of the invention is to provide a novel apparatus for demounting a tire from a wheel wherein the wheel is axially pulled with uniformly distributed force from the tire.

It is still a further object of the invention to provide a novel power actuated device for pulling a wheel off a pneumatic tire wherein special tire bead engaging members are provided to insure even distribution of the pulling force.

Further objects of the invention will appear as the description proceeds in connection with the appended claims and the annexed drawings wherein:

FIGURE 1 is a rather diagrammatic elevation showing a preferred location of the apparatus of the invention recessed in the floor of a garage;

FIGURE 2 is a perspective exploded view of the wheel pulling apparatus, partially broken away and partially sectioned to show details;

FIGURE 3 is a perspective assembled view partially broken away and sectioned with the parts assembled and a tire and wheel assembly shown in place;

FIGURE 4 is a section through the assembly showing the special wedges;

FIGURE 5 is a fragmentary view partly in section showing a manner of mounting wedges and the adapter ring;

FIGURE 6 is an enlarged fragmentary section showing how the wedges act to break away the tire bead; and FIGURE 7 is a fragmentary section showing a wedge and return spring mounting on the adaptor ring.

FIGURE 1 shows the preferred location of the apparatus of the invention in a garage as located in a pit 11 below floor level 12 and normally covered by grating 13. The apparatus is shown at 14, and the electrical controls therefor at 15 are connected by conduits 16 to a switch at 17. The advantage of locating the apparatus in a pit is that heavy tires need not be lifted but may merely be rolled up to the pit and allowed to fall over onto the top of apparatus 14.

The apparatus of the invention in its preferred embodiment comprises a rigid casing 18 that encloses the bottom and sides of the various mechanisms and has a top horizontal wall 19 formed with a large preferably circular opening 21. Wall 19 may be integral or it may be a removable cover suitably mounted on the casing.

A horizontal internal wall 22 is provided within casing 18 formed with an opening 20 smaller than that at 21. As shown in FIGURE 3 wall 22 is adapted to support an adapter ring 23 which as illustrated is annular with an internal diameter larger than the wheel to be pulled therethrough.

Ring 23 may be of generally U-shape in cross-section with a flat top horizontal wall 24 that lies flush with top casing wall 19 and is formed along its inner periphery with a rounded upstanding circular bead 25. Ring 23 loosely seats on wall 22 in the assembly and is adapted to underlie the tire.

Below wall 22 is a mechanism compartment 26 containing an electric motor 27, a hydraulic fluid pump 28 driven by motor 27 and an upright hydraulic cylinder 29 that has a vertical piston rod 31 projecting up through the center of ring 23. Compartment 26 also contains suitable fluid lines indicated at 32 for connecting opposite ends of the cylinder 29 with a reversing valve assembly 33 at the pump outlet controlled by levers 34 and 35. Thus the flow of hydraulic fluid to cylinder 29 may be reversed at will to raise or lower rod 31.

Internal braces 36 (FIGURE 2) are provided between walls 19 and 22. Preferably cylinder 29 is mounted on its lower end on a wide base member or channel 37 rigid with the bottom of the pit or the casing 18. As shown in FIGURE 2 the lower end of hydraulic cylinder 29 is pivotally supported on base 37 on a generally horizontal axis by pivot pins 38. Thus cylinder 29 may be rocked about the axis of pins 38 to facilitate mounting of a wheel into the assembly.

When the device is used a wheel and tire unit is rolled up to the pit and turned over so that the tire rests on the upper walls 19 and 24 as shown in FIGURE 3. Piston rod 31 is fully vertically extended through the apertured center of wheel 41 which has a rim 42, flanged along one edge as indicated at 44, on which is mounted tire 43 to be removed over inner rim flange 44 as illustrated in FIGURE 4. A lock plate 45 has a radial slot 46 through its bore to pass the enlarged lock member 47 on the upper end of rod 31, and a transverse bore 50 is formed in member 47 to receive a lock pin 48.

Plate 45 is larger than the central opening of the wheel 41 and therefore in the assembly of FIGURE 3 rests on the top of the wheel 41 with its slot 46 turned out of alignment with lock member 47. Thus downward movement of rod 31 exerts a direct downward axial pull on the wheel 41.

FIGURE 4 shows the basic action of the apparatus in pulling wheel 41 through tire 43. It will be noted that the tire is maintained on the top of the casing with the lower (in FIGURE 4) bead thereof engaging the bead 25 of adapter ring 23 so that there is no sidewise shift of the tire during the operation, and no contact with rim flange 44, thereby insuring against the commonest damage to tubeless tire assemblies, namely rim flange damage. As is well known, the sealing action in tubeless tires is all at the edge of the rim flanges, and rim flange damage is fatal to the desired seal. This apparatus does not touch the rim flanges, but applies pressure only to the face of the wheel or the tire bead lying inwardly of the rim flange 44.

A plurality of powered wedge assemblies 51 (here four) are mounted on brackets 52 on the underside of wall 19. Each of these comprises a power cylinder 53 having a piston rod 54 on the edge of which is a wedge 55. These assemblies are so arranged around the periphery of the hole in the casing as to be radially directed with respect to the wheel.

As shown in FIGURES 3 and 4 the wedges are extendable through radially aligned openings 56, 57 in the walls of adapter ring 23 so that their inner edges may enter between the rim flange 44 and the tire bead upon inward displacement of rods 54. Outer opening 56 may extend down to wall 22 for installation of the ring 23 in the assembly where the wedges are mounted directly on units 51. A suitable hydraulic control system is provided whereby each of the wedges 55 is simultaneously retracted or advanced radially of the wheel through a limited stroke, preferably not exceeding 1½ inches, so that the wedge ends never forceably engage wheel rim 42. A suitable control therefore may be provided outside the casing.

In the actual operation of pulling a wheel from the tire, the procedure is to arrange the parts as shown in FIGURE 3 and then energize cylinder 29 to pull down on the wheel 41 for a short distance, preferably about one inch, normally sufficient to press the tire side wall inwardly and break the tire bead away from rim flange 44. Then the suitable control is actuated to advance the wedges 55, which have up to this time been in idle retracted position, radially inwardly. It will be seen (FIGURE 6) that should the tire bead still be stuck to the wheel rim and flange 44 the wedges 55 will enter between the tire bead and wheel flange 44 and break the tire loose all around the wheel. Obviously as many devices 51 may be used as desired. The valve stem is pushed into the interior of the wheel. Then the cylinder 29 is again energized to pull down further on wheel 41 until ultimate separation of the wheel and tire is obtained.

It will be appreciated that instead of using adapter rings 23 such may be omitted and the upper wall 19 may be extended inwardly and formed with bead 25 directly on its opening edge. However the advantage of adapter rings such as at 23 is to allow the selective use of different internal diameter adapter rings to suit different wheel and tire sizes.

Where an adapter ring is used the wedge may be a separable element 55 slidably mounted in a radial guide 58 (FIGURES 5 and 7) on the underside of wall 24 with a socketed outer end 59 to receive piston rod 54 and a return spring 61 built into the device for automatically retracting the wedge when the piston rod 54 is retracted.

The invention assures that the wheel 41 is pulled away from the tire with uniform pressure constantly exerted all around the tire periphery so that the danger of breaking the tire bead or wall is minimized while at the same time the tire is removed from the wheel in a matter of seconds only.

The principles of the invention may be extended into other fields such as pulling gears from shafts, pipe bending, metal shaping and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for forcibly demounting a pneumatic tire from a wheel rim comprising means defining a generally horizontal annular stationary supporting surface surrounding an opening larger than the wheel diameter, said surface being adapted to support directly one side of the tire, means mounting a motor below said opening with a reciprocable power driven shaft of said motor extending up through said opening, an annular adapter ring mounted in said apparatus and having an upper wall forming the radially inner portion of said surface surrounding said opening, a plurality of radially directed power units mounted beneath said surface outwardly of said adapter ring, means defining a plurality of apertures extending through the adapter ring in radial alignment with said power units, rim engaging wedges operatively connected at their outer ends to said power units and extending through said apertures in the adapter ring, and means adapted to be interposed between the shaft and the other side of the wheel for transmitting downward axial displacement of the shaft positively to said wheel.

2. In the apparatus defined in claim 1, said power units being secured to the outer portion of said horizontal surface defining means, and said wedges being slidably mounted on the adapter ring, and cooperating socket connections for operably connecting the power units and wedges when the adapter ring is mounted in the apparatus.

References Cited in the file of this patent

UNITED STATES PATENTS

| | | |
|---|---|---|
| 1,481,061 | Hunter | Jan. 15, 1924 |
| 2,446,963 | Stolz | Aug. 10, 1948 |
| 2,449,289 | Garey | Sept. 14, 1948 |
| 2,513,756 | Smyser | July 4, 1950 |
| 2,566,315 | Christofoli et al. | Sept. 4, 1951 |
| 2,595,258 | Hildred | May 6, 1952 |
| 2,778,414 | Oglesby | Jan. 22, 1957 |
| 2,792,057 | Schreiner | May 14, 1957 |
| 2,815,802 | Schultz | Dec. 10, 1957 |
| 2,818,108 | Wells | Dec. 31, 1957 |

FOREIGN PATENTS

| | | |
|---|---|---|
| 607,925 | Great Britain | Sept. 7, 1948 |